United States Patent
Arnold et al.

(10) Patent No.: US 9,659,110 B2
(45) Date of Patent: May 23, 2017

(54) ASSOCIATIVE MEMORY TECHNOLOGY FOR ANALYSIS OF REQUESTS FOR PROPOSAL

(75) Inventors: William G. Arnold, Jacksonville, FL (US); Brian Warn, Seattle, WA (US); John Whelan, Burien, WA (US); Jaime Antonio Flores, Jr., Auburn, WA (US)

(73) Assignee: THE BOEING COMPANY, Chicago, IL (US)

( * ) Notice: Subject to any disclaimer, the term of this patent is extended or adjusted under 35 U.S.C. 154(b) by 133 days.

(21) Appl. No.: 13/277,771

(22) Filed: Oct. 20, 2011

(65) Prior Publication Data

US 2013/0103690 A1 Apr. 25, 2013

(51) Int. Cl.
G06F 7/00 (2006.01)
G06F 17/30 (2006.01)
G06Q 10/10 (2012.01)
G06Q 30/06 (2012.01)

(52) U.S. Cl.
CPC .. G06F 17/30982 (2013.01); G06F 17/30312 (2013.01); G06F 17/30598 (2013.01); G06Q 10/10 (2013.01); G06Q 30/0611 (2013.01)

(58) Field of Classification Search
CPC .............. G06F 17/30312; G06F 17/30598
USPC ............................................. 707/740
See application file for complete search history.

(56) References Cited

U.S. PATENT DOCUMENTS 3,766,533 A * 10/1973 Black et al. ............. 365/125
6,374,237 B1 * 4/2002 Reese
7,035,903 B1 * 4/2006 Baldonado ............... 709/206
7,392,229 B2 6/2008 Harris et al.
8,065,293 B2 * 11/2011 Mukerjee et al. ......... 707/711
8,352,488 B2 1/2013 Fleming et al.
(Continued)

FOREIGN PATENT DOCUMENTS

JP 2006127397 A 5/2006
JP 2011138306 A 7/2011

OTHER PUBLICATIONS

Extended European Search Report, dated Apr. 6, 2016, regarding application No. EP12188128.8, 12 pages.
(Continued)

Primary Examiner — Mark E Hershley
(74) Attorney, Agent, or Firm — Yee & Associates, P.C.

(57) ABSTRACT

A system for analyzing a request for proposal. The system includes an associative memory including a plurality of data having a plurality of associations. The system also includes an input device in communication with the associative memory. The input device is configured to provide the request for proposal to the associative memory in a format understandable to the associative memory. The associative memory is configured to digest the request for proposal to be included within the plurality of data, wherein a digested request for proposal is formed. The system also includes an analyzer in communication with the associative memory. The associative memory is configured to analyze the digested request for proposal by receiving a query comprising one or more terms, creating relationships among the plurality of data in the associative memory based on the query, and returning an output that includes requirements or other attributes presented in the digested request for proposal based on the query.

24 Claims, 6 Drawing Sheets

(56) References Cited

U.S. PATENT DOCUMENTS

| | | | |
|---|---|---|---|
| 8,364,557 B2* | 1/2013 | Cullen et al. | 705/26.4 |
| 2001/0051913 A1* | 12/2001 | Vashistha et al. | 705/37 |
| 2002/0111889 A1* | 8/2002 | Buxton et al. | 705/35 |
| 2003/0216971 A1* | 11/2003 | Sick et al. | 705/26 |
| 2004/0080973 A1* | 4/2004 | Ogura | 365/145 |
| 2006/0293921 A1* | 12/2006 | McCarthy et al. | 705/2 |
| 2007/0147568 A1* | 6/2007 | Harris et al. | 375/368 |
| 2008/0250039 A1 | 10/2008 | Franks et al. | |
| 2008/0313143 A1* | 12/2008 | Warn et al. | 707/3 |
| 2010/0094878 A1* | 4/2010 | Soroca et al. | 707/748 |
| 2010/0114387 A1* | 5/2010 | Chassin | 700/286 |
| 2010/0268673 A1* | 10/2010 | Quadracci | 706/12 |
| 2010/0306227 A1* | 12/2010 | Fleming et al. | 707/763 |
| 2011/0213631 A1* | 9/2011 | Mislavsky | 705/7.11 |
| 2012/0036098 A1 | 2/2012 | Hanneman et al. | |
| 2012/0233109 A1 | 9/2012 | Hanneman et al. | |
| 2013/0080448 A1 | 3/2013 | Arnold et al. | |

OTHER PUBLICATIONS

Chisvin L et al., "Content-addressable and associative memory: alternatives to the ubiquitous RAM"; Computer; IEEE; US; Jul. 1, 1989; pp. 61-64, vol. 22, No. 7; XP011436720. (abstract).

Canadian Office Action mailed Oct. 19, 2015, regarding application No. 2786355, 3 pages.

Japanese Office Action, dated Jul. 19. 2016, regarding Application No. 2012230778, 10 pages.

Canadian Office Action mailed Oct. 18, 2016, regarding Application No. 2786355, 4 pages.

Chinese Office Action, dated Oct. 8, 2016, regarding Application No. 201210404436.8, 24 pages.

* cited by examiner

ASSOCIATIVE MEMORY TECHNOLOGY FOR ANALYSIS OF REQUESTS FOR PROPOSAL

BACKGROUND INFORMATION

1. Field

The present disclosure relates generally to using vast stores of data in an associative memory to enable analysts to rapidly analyze requests for proposal and also to develop responses to requests for proposal.

2. Background

Government agencies and some private companies will sometimes issue a request for proposal (RFP) when the organization in question decides to purchase goods or services. Broadly speaking, the request for proposal may describe the goals, requirements, desirables, restrictions, or other parameters set forth by the purchasing organization regarding the request for proposal. A vendor may respond to the request for proposal with one or more proposals to sell the requested goods or services at a particular cost or range of costs. Proposals also may outline a production plan, research plan, organizational details, response to requirements or attributes, and possibly many other factors. The purchasing organization may choose to accept one or more of the proposals, whereupon the purchasing organization may enter into contract negotiations and perhaps, ultimately, a contract with the vendor that supplied the winning proposal.

Requests for proposal may become very complex. In some cases, a request for proposal may span an entire product line for a complex product not yet developed, such as an aircraft with undeveloped capabilities. A request for proposal may span many years of work and may involve basic scientific research that is difficult to predict.

Requests for proposal may also be influenced by other documents often published by the same purchasing organization. For example, some government agencies may issue "broad agency announcements" (BAAs) that may outline the agency's goals and help prepare vendors to respond to an eventual request for proposal. Some requesting organizations may issue a request for a white paper, a short technical paper, and vendors may submit white papers responding to the request. A request for proposal may incorporate by reference broad agency announcements or white papers submitted, perhaps, by third parties. A request for proposal also may include, incorporated by reference, many other types of documents.

As a result, the complexity and the use of incorporation by reference could make any given request for proposal extensive, even if the document itself is short. However, requests for proposal may be long, complex documents with still other documents incorporated by reference. For this reason, requests for proposal may span thousands or even tens of thousands of pages of documents or more.

Because requests for proposal and incorporated documents are often in unstructured or "free text" form, using "text searches" or other search engines is often tedious and time consuming. Using such conventional keyword searches may require that an analyst read an undesirable amount of text. Useful information is then aggregated to determine the complete range of requirements, the greatest need or desire reflected in the request, effective approaches for addressing the needs or desires, and the relative probability for success of the available approaches. This process may take an undesirable amount of time and may require a significant degree of subject matter expertise to determine what information is relevant, what is truly most important to the issuing organization, and what information should be specifically responded-to in a proposal.

Further increasing the difficulty of preparing a proposal, the issuing organization may allow only a short time to prepare a response. As a result, especially when responding to complex requests for proposal, a vendor may draft a "shotgun-style" response detailing vendor capabilities rather than addressing specific requirements or attributes buried in the request for proposal. In other words, the response may have to be prepared more quickly than desired relative to the time needed to prepare a desired response, resulting in a proposal that may be considered undesirable by the vendor, the issuing organization, or both.

Quickly responding to an extensive set of documents in a precise and efficient manner may be difficult, or even impractical, and may involve many hours of labor by entire teams of subject matter experts and support personnel at great expense to the vendor. Given that any particular proposal may or may not be accepted by the requesting organization, vendors that wish to submit a response to a request for proposal may desire to produce the proposal efficiently as well as accurately and completely.

SUMMARY

The advantageous embodiments provide for a system for analyzing a request for proposal and for developing responses to a request for proposal. The system includes an associative memory including a plurality of data having a plurality of associations. The plurality of data is collected into associated units of data. The associative memory is configured to be queried based on at least one relationship selected from the group that includes direct relationships and indirect relationships among the plurality of data. The associative memory further includes a content-addressable structure. The system also includes an input device in communication with the associative memory. The input device is configured to provide the request for proposal to the associative memory in a format understandable to the associative memory. The associative memory is configured to digest the request for proposal to be included within the plurality of data, wherein a digested request for proposal is formed. The system also includes an analyzer in communication with the associative memory. The associative memory is configured to analyze the digested request for proposal by receiving a query comprising one or more terms, creating relationships among the plurality of data in the associative memory based on the query, and returning an output that includes requirements or other attributes presented in the digested request for proposal based on the query.

The advantageous embodiments also provide for a method for analyzing a request for proposal and for developing responses to a request for proposal. The method may be implemented using a processor in conjunction with an associative memory including a plurality of data having a plurality of associations. The plurality of data is collected into associated units of data. The associative memory is configured to be queried based on at least one relationship selected from the group that includes direct relationships and indirect relationships among the plurality of data. The associative memory further includes a content-addressable structure. The method includes receiving the request for proposal to the associative memory in a format understandable to the associative memory. The method also includes digesting, in the associative memory, the request for proposal such that the request for proposal is included within the plurality of data, wherein a digested request for proposal is formed. The method also includes analyzing, using the processor in conjunction with the associative memory, the digested request for proposal by receiving a query comprising one or more terms and creating relationships among the plurality of data in the associative memory based on the query. The method also includes returning, using the processor in conjunction with the associative memory, an output that includes requirements or other attributes presented in the digested request for proposal based on the query.

The advantageous embodiments also provide for a data processing system comprising a processor, a bus connected to the processor, an associative memory connected to the bus, and a non-transitory computer readable storage medium connected to the bus. The associative memory includes a plurality of data having a plurality of associations. The plurality of data is collected into associated units of data. The associative memory is configured to be queried based on at least one relationship selected from the group that includes direct relationships and indirect relationships among the plurality of data. The associative memory further includes a content-addressable structure. The non-transitory computer readable storage medium stores a set of instructions which, when executed by the processor, implement a method. The method comprises receiving a request for proposal in the associative memory in a format understandable to the associative memory. The method also includes digesting, in the associative memory, the request for proposal such that the request for proposal is included within the plurality of data, wherein a digested request for proposal is formed. The method further includes analyzing, using the processor in conjunction with the associative memory, the digested request for proposal by receiving a query comprising one or more terms and creating relationships among the plurality of data in the associative memory based on the query. The method also includes returning, using the processor in conjunction with the associative memory, an output that includes requirements or other attributes presented in the digested request for proposal based on the query.

The advantageous embodiments also provide for a non-transitory computer readable storage medium storing instructions which, when executed by a processor, carry out a method for analyzing a request for proposal and for developing responses to a request for proposal. The method may be implemented using the processor in conjunction with an associative memory including a plurality of data having a plurality of associations. The plurality of data is collected into associated units of data. The associative memory is configured to be queried based on at least one relationship selected from the group that includes direct relationships and indirect relationships among the plurality of data. The associative memory further includes a content-addressable structure. The instructions may include instructions for providing the request for proposal to the associative memory in a format understandable to the associative memory. The instructions may include instructions for digesting, in the associative memory, the request for proposal such that the request for proposal is included within the plurality of data, wherein a digested request for proposal is formed. The instructions may include instructions for analyzing, using the processor in conjunction with the associative memory, the digested request for proposal by receiving a query comprising one or more terms and creating relationships among the plurality of data in the associative memory based on the query. The instructions may include instructions for returning, using the processor in conjunction with the associative memory, an output that includes requirements or other attributes presented in the digested request for proposal based on the query.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof will best be understood by reference to the following detailed description of an advantageous embodiment of the present disclosure when read in conjunction with the accompanying drawings, wherein:

DETAILED DESCRIPTION

Figure 1:
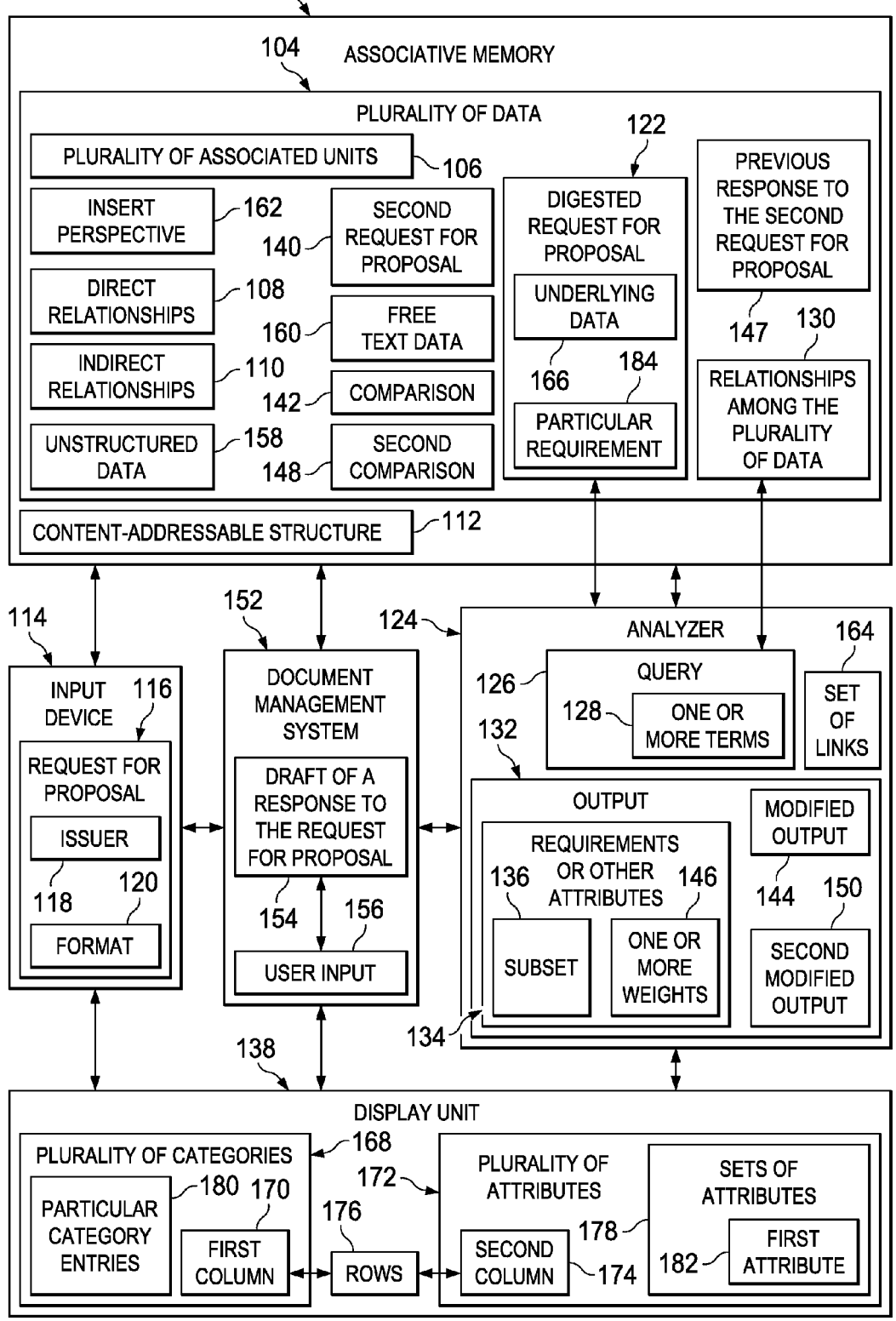
FIG. 1 is an illustration of a block diagram of a system for analyzing a request for proposal in accordance with an advantageous embodiment.

The advantageous embodiments recognize and take into account that it may be impractical to submit a request for proposal that is accurate, complete, and efficiently produced. Even if efficiently produced, relatively speaking, an organization may seek to further increase the efficiency of responding to a request for proposal. The advantageous embodiments also recognize and take into account that many types of data may be analyzed as part of preparing a response to a request for proposal, and that analyzing all of the available data may be impractical on a desired time scale. Thus, the advantageous embodiments provide a mechanism for a user to quickly identify and evaluate data for the purpose of generating a request for proposal. The advantageous embodiments may have many other applications.

For example, the advantageous embodiments may take advantage of an associative memory as part of processing a large number of free text documents and possibly other kinds of data. The advantageous embodiments may take advantage of the associations stored in the associative memory to find relevant data and trends in the overall set of data quickly and efficiently, thereby increasing both the speed and accuracy of an evaluation. Requirements or goals of the organization issuing the request for proposal may become apparent as a result of a query using the advantageous embodiments. These requirements or goals otherwise may not have been apparent at all. The evaluation may then be used to generate a request for proposal. Stated differently, the advantageous embodiments may reduce the amount of time and effort used to aggregate and process data used to develop effective responses or drafts of responses to requests for proposal.

In a specific non-limiting advantageous embodiment, an analyst or planner may be tasked with developing a request for proposal to produce a new kind of aircraft having desired properties. The technology to implement the desired properties may not exist at the time the request for proposal is issued. In performing this task, a planner may benefit greatly from knowing what has and has not worked in the past when conducting research into related technologies, as well as what has and has not worked in the past with respect to related requests for proposal. Often, such data may be in the form of past requests for proposal, past responses to requests for proposal, broad agency announcements, white papers, technical publications, and other sources of data. The task of reading each document in this set of data in order to extract and aggregate common scenarios, identify valuable lessons learned, and develop an effective response to a request for proposal may be manually intensive, time consuming, and prone to human error. These disadvantages may increase with the amount of data to be reviewed.

However, the advantageous embodiments contemplate creating a specific associative memory by aggregating disparate data sources, such as those described above. The focus of this associative memory may be to remember entities, their attributes, and the associations and relationships relevant to conditions, goals, and/or requirements described in the sources. By identifying the associations and relationships between entities using the associative memory, the analyst or planner may have the ability to uncover patterns and valuable pieces of information that otherwise may not be discernible during a manual review process. Thus, the advantageous embodiments may leverage an associative memory to rapidly perform the same task that would have taken one or more analysts many hours, or longer, to perform. This advantage may result in the recovery of valuable time for the human analyst or planner. This advantage also may reduce the tendency for human error and increase operational efficiency of human resources.

In an advantageous embodiment, a process may include querying the associative memory. The query may produce a result list of requirements or attributes associated with the term(s) entered in the query. The returned list may be ordered or ranked based on the query.

The advantageous embodiments may handle unstructured, free text data by breaking it down into recognizable and comparable units without limiting any data. The advantageous embodiments may avoid use of reductive algorithms or rules, such as those used in many other data mining techniques.

As used herein, the term "associative memory" refers to a plurality of data and plurality of associations among the plurality of data. The data and associations may be stored in a non-transitory computer readable storage medium. The plurality of data may be collected into associated groups. The associative memory may be configured to be queried based on indirect relationships among the plurality of data in addition to direct correlations among the plurality of data. The associative memory also may be configured to be queried based on direct relationships, and combinations of direct and indirect relationships. The associative memory may be configured to map input patterns in the plurality of data to output patterns in the plurality of data.

The advantageous embodiments provide for an associative memory comprising a plurality of data and a plurality of associations among the plurality of data. The plurality of data may be collected into associated groups. The associative memory may be configured to be queried based on at least one relationship, selected from the group that includes direct and indirect relationships, among the plurality of data in addition to direct correlations among the plurality of data. Associative memory also may take the form of software. Thus, associative memory also may be considered a process by which information is collected into associated groups in the interest of gaining new insight based on relationships rather than direct correlations.

As used herein, a "perspective" may be a "point of view". With respect to an associative memory, a perspective may be a choice of a context for a particular aspect of a user's domain. As used herein, an "insert perspective" is a type of perspective that may be fed back into an associative memory, and which may be viewable from other perspectives as a possible resource.

As used herein, a "request for proposal" may include an actual document entitled a "request for proposal", but also may include any documents incorporated by reference into the request for proposal, and also may include any other solicitation to submit a proposal or to enter into a contract or contract negotiations. Thus, the advantageous embodiments are not limited solely to documents entitled "request for proposal", but may include "bit and proposals", or any other solicitation. The term "request for proposal" also may include a request for information without soliciting a proposal, a contract, or a request for a contract. For example, the term "request for proposal" may contemplate a request for a white paper, a technical document, or another request for information. The advantageous embodiments may be used by multiple users including one or more requesting organizations, one or more vendors, one or more sub-contracting vendors, one or more subject matter experts, one or more third parties, or various other users, with possibly multiple such users coordinating an effort to prepare a response to a request for proposal.

FIG. 1 is an illustration of a block diagram of a system for analyzing a request for proposal in accordance with an advantageous embodiment. System 100 shown in FIG. 1 may be implemented using one or more data processing systems, possibly in a distributed or networked environment, and possibly by a group of remotely administered data processing systems known as the "cloud". Each of the one or more data processing systems that implement system 100 may be data processing system 700 described with respect to FIG. 7, or variations thereof. System 100 may be characterized as including one or more components referenced by individual names. Each of these components may be separate or part of a monolithic architecture, or some components may be combined into one hardware or software system in communication with other components in system 100. System 100 may take the form of hardware, software, or a combination thereof.

System 100 may be a system for analyzing unstructured data, but also may be a system for analyzing other kinds of data such as, but not limited to, structured data, video data, audio data, picture data, encrypted data, and many other kinds of data. System 100 may include associative memory 102 including plurality of data 104 having plurality of associated units 106. An associated unit of data may be two or more data that are associated with each other in some manner. For example, two data may be a name and a place associated with each other in that both the name and the place are associated with the same request for proposal. This example in no way limits the associations among two or more data, as many different examples are possible in many different types of contexts.

In an advantageous embodiment, associative memory 102 may be configured to be queried based on at least one relationship selected from the group that includes direct relationships 108 and indirect relationships 110 among plurality of data 104. An example of a direct relationship may be the example of an associated unit of data, such as a name associated with a place, as described above.

An indirect relationship may exist when a direct relationship does not exist, but where data is indirectly connected. An example of an indirect relationship may be when a first associated unit of data is directly related to a second associated unit of data and a third associated unit of data is directly related to the second associated unit of data. In this case, the first associated unit of data and the third associated unit of data may be considered indirectly related to each other. For example, a name may be directly associated with a place, and an event may be directly associated with the same place. In this case, the name may be indirectly associated with the event. Many other examples of direct and indirect relationships are possible.

In an advantageous embodiment, associative memory 102 further may include content-addressable structure 112. Content-addressable structure 112 may provide associative memory 102 with the capability to be queried based on the content of plurality of data 104 itself, rather than on only addresses associated with the content of plurality of data 104. In an advantageous embodiment, content-addressable structure 112 may map input patterns in plurality of data 104 to output patterns in plurality of data 104.

In an advantageous embodiment, system 100 may include input device 114 in communication with associative memory 102. Input device 114 may be configured to provide request for proposal 116 from issuer 118 to associative memory 102 in format 120 that is understandable to associative memory 102. Associative memory 102 may be configured to digest request for proposal 116 to be included within plurality of data 104. In this manner, digested request for proposal 122 may be formed.

System 100 also may include analyzer 124 in communication with associative memory 102. Analyzer 124 may be configured to analyze digested request for proposal 122 by receiving query 126 comprising one or more terms 128, creating relationships among the plurality of data 130 in associative memory 102 based on query 126, and returning output 132 that may include requirements or other attributes 134 presented in digested request for proposal 122 based on query 126.

In an advantageous embodiment, analyzer 124 may be further configured to return output 132 such that subset 136 of requirements or other attributes 134 in digested request for proposal 122 that is of most importance to issuer 118 of request for proposal 116 will be displayed most prominently on display unit 138. Display unit 138 may be embodied in any convenient form, such as display 714 in FIG. 7.

In another advantageous embodiment, analyzer 124 may be further configured to compare digested request for proposal 122 to a previously received second request for proposal 140 to form comparison 142. In this case, analyzer 124 may be further configured to modify output 132 based on comparison 142 to form modified output 144.

In another advantageous embodiment, analyzer 124 may be further configured to return output 132 based on one or more weights 146 applied to requirements or other attributes 134. In another advantageous embodiment, analyzer 124 may be further configured to compare digested request for proposal 122 to previous response to the second request for proposal 147 to form second comparison 148. In this case, analyzer 124 may be further configured to modify output 132 based on second comparison 148 to form second modified output 150.

In an advantageous embodiment, system 100 may further include document management system 152. In an advantageous embodiment, document management system 152 may be configured to receive output 132 and use output 132 to produce draft of a response to the request for proposal 154. Document management system 152 also may be configured to receive second modified output 150 and use second modified output 150 to produce draft of a response to the request for proposal 154. In an advantageous embodiment, document management system 152 may be further configured to receive user input 156 and incorporate user input 156 with output 132 and/or modified output 144 and/or second modified output 150 to produce draft of a response to the request for proposal 154.

In an advantageous embodiment, plurality of data 104 may include at least one of unstructured data 158 and free text data 160. In an advantageous embodiment, query 126 may be received from insert perspective 162 of associative memory 102. In this case, analyzer 124 may be further configured to return output 132 such that subset 136 of requirements or other attributes 134 in digested request for proposal 122 that is of most importance to issuer 118 of request for proposal 116 may be displayed most prominently on display unit 138. Moreover, analyzer 124 may be configured to return subset 136 of requirements or other attributes 134 based on query 126.

In an advantageous embodiment, analyzer 124 may be further configured to generate set of links 164 linking requirements or other attributes 134 to underlying data 166 found in digested request for proposal 122. In this case, display unit 138 may be in communication with analyzer 124. Display unit 138 may be configured to display output 132 and set of links 164.

In an advantageous embodiment, display unit 138 may be configured to display plurality of categories 168 organized in first column 170, and also to display plurality of attributes 172 organized in second column 174. In this case, rows 176 across first column 170 and second column 174 may include sets of attributes 178 in plurality of attributes 172 that correspond to particular category entries 180 in plurality of categories 168. In an advantageous embodiment, display unit 138 may be configured to highlight first attribute 182 in sets of attributes 178. First attribute 182 may indicate particular requirement 184 in digested request for proposal 122 that is of most importance to issuer 118 of request for proposal 116.

In an advantageous embodiment, analyzer 124 may be further configured to analyze digested request for proposal 122 by discovering relationships among the plurality of data 130 based on query 126 and storing those relationships. In an advantageous embodiment, analyzer 124 may be configured to return output 132 in a time faster than a human working alone could analyze plurality of data 104 and return output 132.

Thus, the advantageous embodiments may use associative memory technology coupled with a custom user interface to enable business analysts responsible for completing responses to requests for proposal to more effectively analyze the requirements of the request for proposal, understand better those requirements that are of most importance to the organization releasing the request for proposal, compare the request for proposal to previously received requests for proposal to leverage past work, and produce a proposal document in response to the request for proposal which addresses requirements or other attributes in the document much more thoroughly than a human working alone. In this manner, the odds of a proposal being accepted, and a subsequent contract signed, may be improved.

Figure 2:
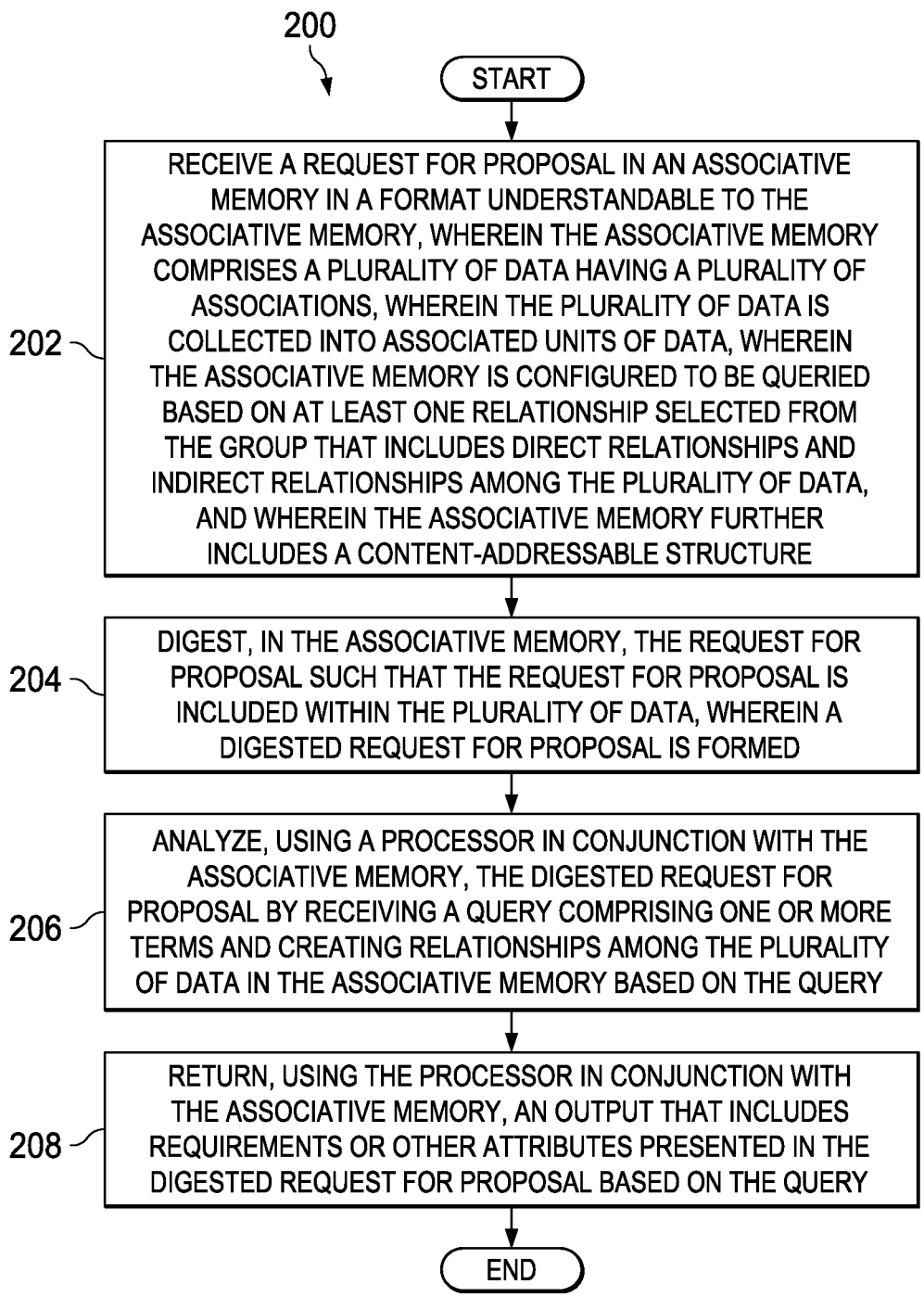
FIG. 2 is an illustration of a flowchart of a process for analyzing a request for proposal in accordance with an advantageous embodiment.

FIG. 2 is an illustration of a flowchart of a process for analyzing a request for proposal in accordance with an advantageous embodiment. Process 200 shown in FIG. 2 may be implemented in a module, system, or data processing system, such as system 100 of FIG. 1 or data processing system 700 of FIG. 7. Process 200 described with respect to FIG. 2 may be implemented in the form of a non-transitory computer readable storage medium storing computer readable code which, when implemented by a processor, may execute the method described with respect to FIG. 2. While the operations of FIG. 2 are described as being implemented by a "system," process 200 is not limited to being implemented by the systems of FIG. 1 and FIG. 7, but also may be implemented by one or more real or virtual data processing systems, possibly in a distributed or networked environment. Process 200 may be implemented using hardware, software, or a combination thereof. Although the operations described below for process 200 are presented as being performed by a processor, the operations described below may be performed by associative memory 102 of FIG. 1, associative memory 728 of FIG. 7, analyzer 124 of FIG. 1, processor unit 704 of FIG. 7, system 100 of FIG. 1, data processing system 700 of FIG. 7, or by any suitable software component, hardware component, or combinations thereof.

Process 200 may begin by receiving a request for proposal in an associative memory in a format understandable to the associative memory, wherein the associative memory comprises a plurality of data having a plurality of associations, wherein the plurality of data is collected into associated units of data, wherein the associative memory is configured to be queried based on at least one relationship selected from the group that includes direct relationships and indirect relationships among the plurality of data, and wherein the associative memory further includes a content-addressable structure (operation 202). Next, process 200 may include digesting, in the associative memory, the request for proposal such that the request for proposal is included within the plurality of data, wherein a digested request for proposal is formed (operation 204).

Process 200 may then include analyzing, using a processor in conjunction with the associative memory, the digested request for proposal by receiving a query comprising one or more terms and creating relationships among the plurality of data in the associative memory based on the query (operation 206). Process 200 may then include returning, using the processor in conjunction with the associative memory, an output that includes requirements or other attributes presented in the digested request for proposal based on the query (operation 208). The process may terminate thereafter.

The advantageous embodiments shown in FIG. 2 are not meant to imply physical or architectural limitations to the manner in which different advantageous embodiments may be implemented. Other operations in addition to and/or in place of the ones illustrated may be used. Some operations may be unnecessary in some advantageous embodiments. Also, the blocks are presented to illustrate some operations. One or more of these blocks may be combined and/or divided into different blocks when implemented in different advantageous embodiments.

Figure 3:
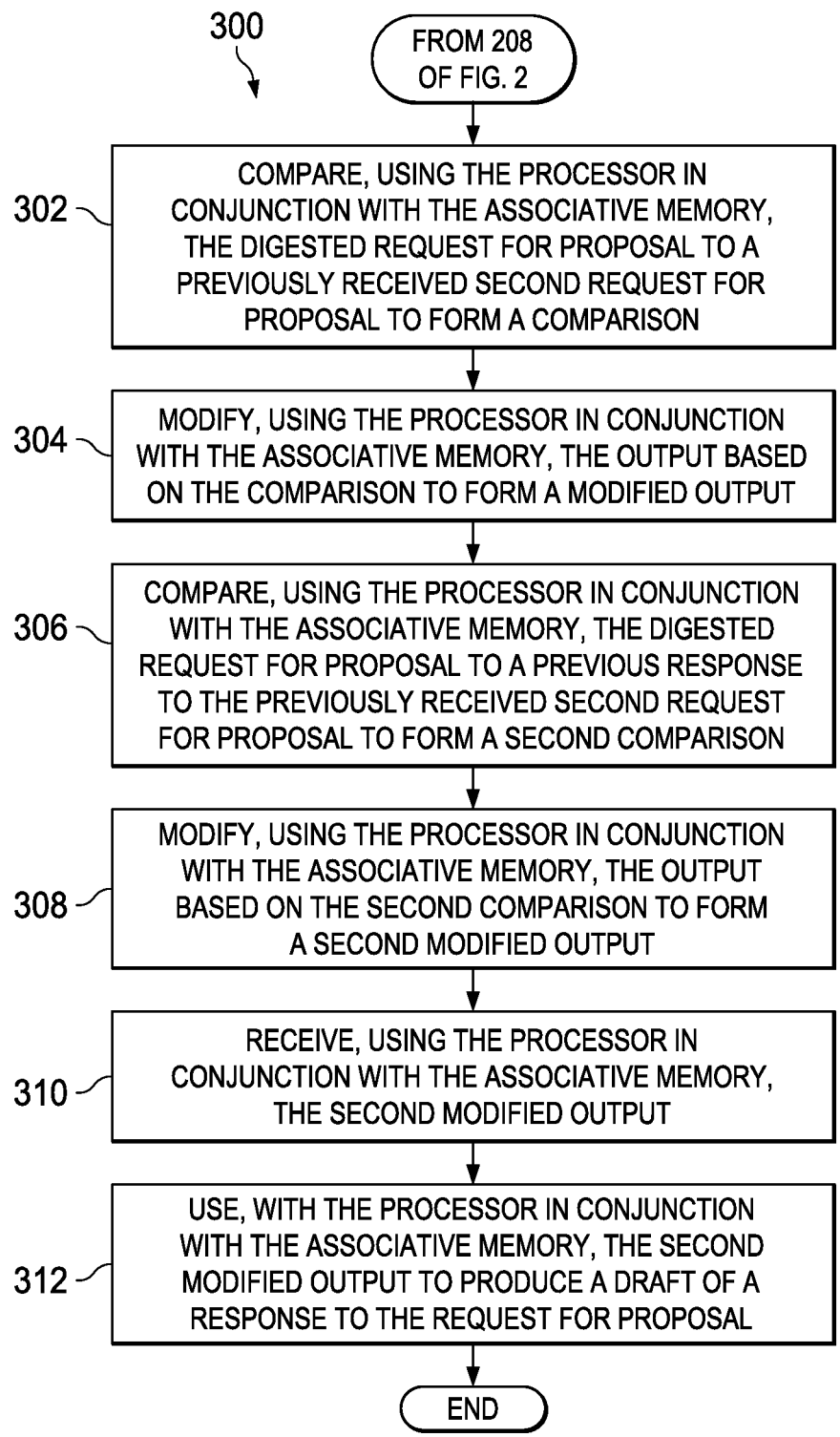
FIG. 3 is an illustration of a flowchart of a process for analyzing a request for proposal in accordance with an advantageous embodiment.

FIG. 3 is an illustration of a flowchart of a process for analyzing a request for proposal in accordance with an advantageous embodiment. Process 300 may be an extension of process 200 shown in FIG. 2. Process 300 shown in FIG. 3 may be implemented in a module, system, or data processing system, such as system 100 of FIG. 1 or data processing system 700 of FIG. 7. Process 300 described with respect to FIG. 3 may be implemented in the form of a non-transitory computer readable storage medium storing computer readable code which, when implemented by a processor, may execute the method described with respect to FIG. 3. While the operations of FIG. 3 are described as being implemented by a "system", process 300 is not limited to being implemented by the systems of FIG. 1 and FIG. 7, but also may be implemented by one or more real or virtual data processing systems, possibly in a distributed or networked environment. Process 300 may be implemented using hardware, software, or a combination thereof. Although the operations described below for process 300 are presented as being performed by a processor, the operations described below may be performed by associative memory 102 of FIG. 1, associative memory 728 of FIG. 7, analyzer 124 of FIG. 1, processor unit 704 of FIG. 7, system 100 of FIG. 1, data processing system 700 of FIG. 7, or by any suitable software component, hardware component, or combinations thereof.

As indicated above, process 300 may be an extension of process 200 of FIG. 2. Thus, process 300 may begin after operation 208 in FIG. 2, rather than process 200 terminating after operation 208 in FIG. 2.

Process 300 may begin by comparing, using the processor in conjunction with the associative memory, the digested request for proposal to a previously received second request for proposal to form a comparison (operation 302). The process may then include modifying, using the processor in conjunction with the associative memory, the output based on the comparison to form a modified output (operation 304).

The process may then include comparing, using the processor in conjunction with the associative memory, the digested request for proposal to a previous response to the previously received second request for proposal to form a second comparison (operation 306). The process may then include modifying, using the processor in conjunction with the associative memory, the output based on the second comparison to form a second modified output (operation 308).

The process may then include receiving, using the processor in conjunction with the associative memory, the second modified output (operation 310). The operation may then include using, with the processor in conjunction with the associative memory, the second modified output to produce a draft of a response to the request for proposal (operation 312). The process may terminate thereafter.

The advantageous embodiments shown in FIG. 3 are not meant to imply physical or architectural limitations to the manner in which different advantageous embodiments may be implemented. Other operations in addition to and/or in place of the ones illustrated may be used. Some operations may be unnecessary in some advantageous embodiments. Also, the blocks are presented to illustrate some operations. One or more of these blocks may be combined and/or divided into different blocks when implemented in different advantageous embodiments.

Figure 4:
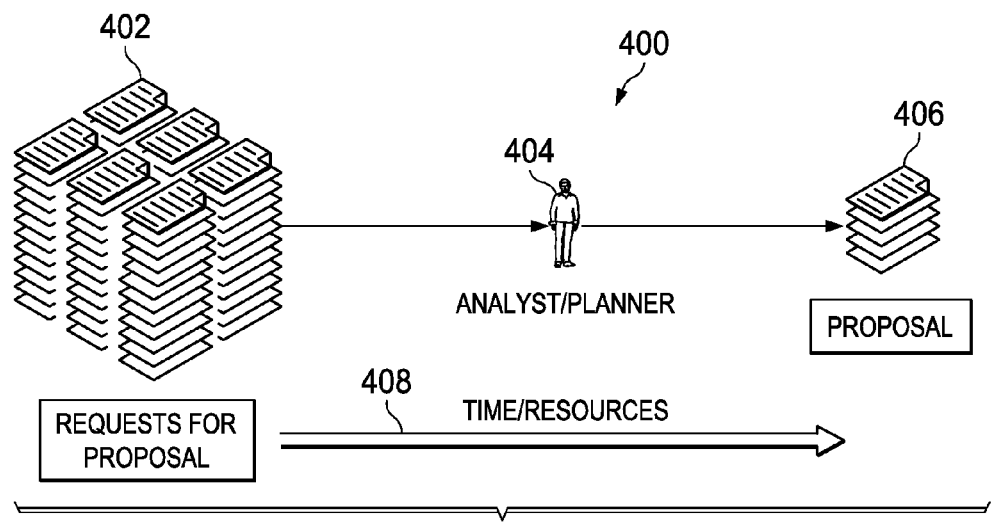
FIG. 4 is an illustration of a single analyst analyzing a request for proposal in accordance with an advantageous embodiment.
Figure 5:
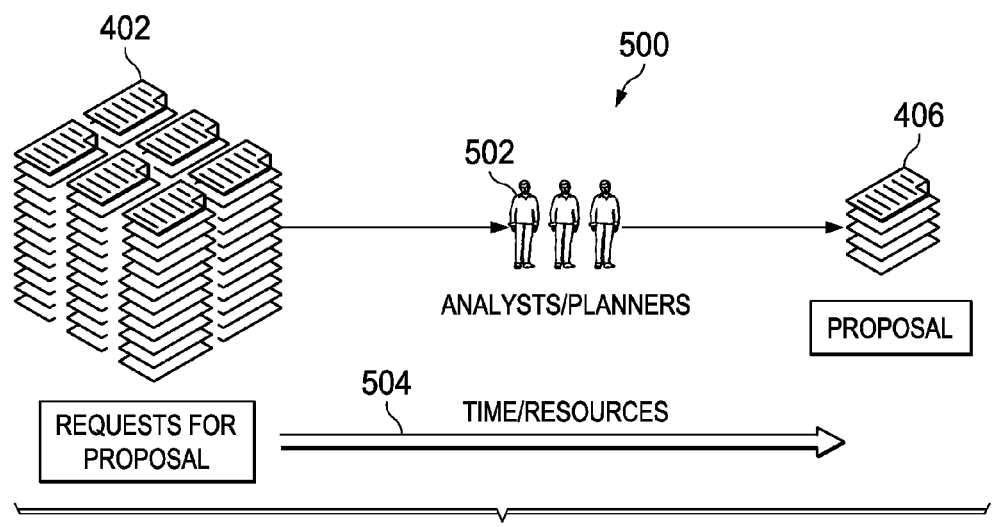
FIG. 5 is an illustration of multiple analysts analyzing a request for proposal in accordance with an advantageous embodiment.

FIG. 4 is an illustration of a single analyst analyzing a request for proposal in accordance with an advantageous embodiment. FIG. 5 is an illustration of multiple analysts analyzing a request for proposal in accordance with an advantageous embodiment. Both FIG. 4 and FIG. 5 may relate to the creation of a proposal based on a request for proposal. The processes shown in FIG. 4 and FIG. 5 may illustrate how the advantageous embodiments may improve upon existing analyst techniques. Reference numerals common to FIG. 4 and FIG. 5 may refer to similar entities and may have similar functions or properties.

The advantageous embodiments are not limited to generation of proposals based on requests for proposal. For example, the advantageous embodiments may apply to many other fields where some kind of plan or conclusion is generated based on bulk data. For example, the advantageous embodiments may apply to generation of a business plan based on a great deal of underlying business data including, but not limited to, reports from successful and failed businesses. The advantageous embodiments also may apply to generation of a scientific investigation plan based on underlying measurements, analysis of research papers, and perhaps other sources of data. Thus, the advantageous embodiments are not limited to the generation of proposals based on requests for proposal. Rather, the particular advantageous embodiments related to operational plans described with respect to FIG. 4 and FIG. 5 should be considered as non-limiting examples of the advantageous embodiments described herein.

Turning now to operation 400 shown in FIG. 4, requests for proposal 402 may be one or more documents relating to a request for proposal. Requests for proposal 402 may be a valuable source of information for analyst or planner 404, but due to the high volume of data and the unstructured nature of the content, mining and extracting valuable information or knowledge from the data may be tedious and time consuming. Extracting knowledge from requests for proposal 402 may require analyst or planner 404 to read through each and every document in requests for proposal 402 to find the best, most useful information. Once each document has been read, the useful information may be aggregated to determine common patterns, situations, and effective approaches for dealing with future or current combat operations. This process may generate proposal 406. However, generating proposal 406 may take time and/or resources 408 and may require subject matter expertise to know what information is relevant and should be extracted.

The higher the volume and relevance of data in requests for proposal 402, the more dependable the knowledge derived from requests for proposal 402. For example, proposal 406 may be considered much more viable if proposal 406 has been proven effective in one hundred to one thousand reports or more, versus one or ten reports. That knowledge, however, may come at the expense of time and/or resources 408 and effort required by analyst or planner 404 to wade through the data to develop proposal 406. Thus, analyst or planner 404 often may face a dilemma of choosing between reliability and speed when attempting to generate proposal 406. When an issuing or requesting organization places a short deadline on submitting proposal 406, both speed and reliability may be important.

Apart from text or Web search engine technologies, which return a set of documents based on the keywords entered, other existing solutions are largely manual and require significant time and effort to derive knowledge from a large amount of data. For example, members of an experienced leadership team may gather and leverage their personal experiences to develop proposal 406. Often, these experiences only come from hundreds of hours in active engagements. Text or Web search engine technologies may be of some aid. However, text or Web search engine technologies still may require analyst or planner 404 to have subject matter expertise to discern the proper keywords for the search and/or to understand any returned documents or text. Additionally, analyst or planner 404 still may have to manually read each document returned, then summarize and aggregate data to create knowledge and later develop proposal 406. Thus, time and/or resources 408 is often undesirably long even when using a text or Web search engine.

Another aspect of the reliability versus speed dilemma is how many analysts or planners may be assigned to generate proposal 406 as shown in FIG. 4 and FIG. 5. In FIG. 4, a single analyst or planner 404 generates proposal 406 based on requests for proposal 402. This approach may be efficient in terms of resources expended. This approach may be more reliable, as a single analyst or planner 404 may have all relevant knowledge at the disposal of analyst or planner 404.

Another approach may be operation 500 of FIG. 5 in which multiple analysts or planners 502 generate proposal 406 based on requests for proposal 402. When multiple analysts or planners 502 generate proposal 406, time and/or resources 504 used to generate proposal 406 may be reduced. However, the per-person cost for generating proposal 406 in terms of time and/or resources 504 may be higher on a pro-rata basis relative to single analyst or planner 404 generating proposal 406 as shown in FIG. 4. Thus, operation 500 may be less efficient relative to operation 400 of FIG. 4.

Figure 6:
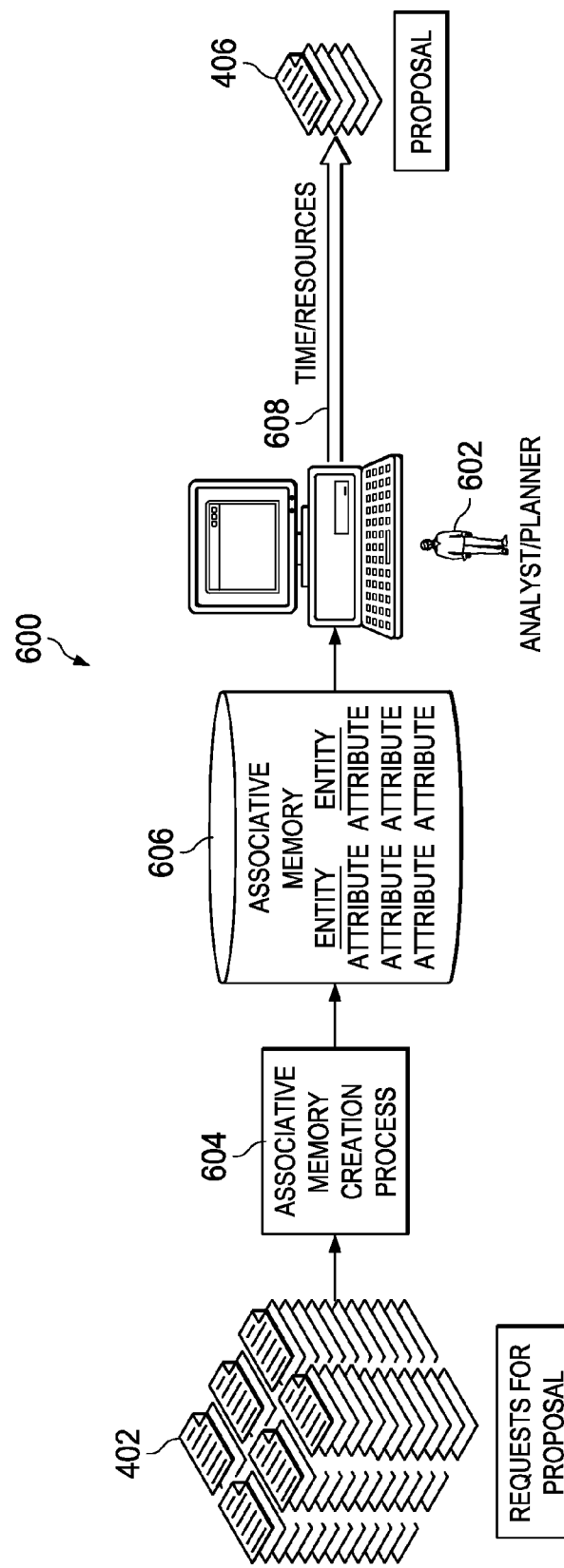
FIG. 6 is an illustration of an analyst using an associative memory to analyze a request for proposal in accordance with an advantageous embodiment.

FIG. 6 is an illustration of an analyst using an associative memory to analyze a request for proposal in accordance with an advantageous embodiment. Elements of the process shown in FIG. 6 may be implemented using a system such as system 100 of FIG. 1, associative memory 102 of FIG. 1, associative memory 728 of FIG. 7, or the insert perspectives described in FIG. 1, FIG. 7, and elsewhere herein. Certain reference numerals used in FIG. 6 may be similar to corresponding reference numerals in FIG. 4 and FIG. 5 and may refer to similar entities and have similar functions or properties.

Using the advantageous embodiments described herein, operation 600 also may involve analyst or planner 602 analyzing requests for proposal 402 to generate proposal 406. Analyst or planner 602 may be a single analyst to increase efficiency, though nothing prevents analyst or planner 602 from representing more than one analyst or planner 602. After associative memory creation process 604 generates associative memory 606, with the creation process performed by analyst or planner 602 or some other user or computer program, analyst or planner 602 may use associative memory 606 to analyze requests for proposal 402. For the reasons given below and above with respect to FIG. 1 through FIG. 5, use of associative memory 606 to perform the analysis of requests for proposal 402 may substantially reduce time and/or resources 608 used to generate proposal 406.

As mentioned above, the advantageous embodiments may reduce time and/or resources 608 used to aggregate and process requests for proposal 402 or other data used to develop proposal 406. In particular, the advantageous embodiments may use associative memory 606 coupled with a custom user interface (not shown) to enable analyst or planner 602 to rapidly develop proposal 406. The advantageous embodiments may leverage associative memory 606 to rapidly evaluate large volumes of free text data, derive significant intelligence or knowledge, and present the results in such a way that enables analyst or planner 602 to efficiently develop proposal 406. For example, if an assigned task is to develop an effective operational plan for the setup of a combat outpost in a foreign country, a planner may benefit greatly from knowing what past approaches have succeeded or failed. Such data may exist in the form of requests for proposal 402, or any other data related to requests for proposal 402.

Associative memory creation process 604 may involve aggregating disparate data sources that are composed of lessons learned from past requests for proposal and also past responses to past requests for proposal. The resulting associative memory 606 may remember entities, their attributes, and the associations or relationships relevant to operational conditions described in requests for proposal 402. By identifying the associations and relationships between entities, the ability to uncover patterns and valuable pieces of information may become a usable asset to analyst or planner 602. Thus, the advantageous embodiments may allow a single analyst or planner 602 to rapidly perform a task that would take one or more analysts many hours to perform. This feature may result in the recovery of valuable time and/or resources. This feature may also reduce the tendency for human error and increase operational efficiency of human resources. Still further, the results and process of creating proposal 406 may be fed back into associative memory 606 and used to create additional relationships for future use.

Analyst or planner 602 may use associative memory 606 by entering search terms into an insert perspective. The resulting output may be presented in a variety of formats, as described elsewhere herein. Analyst or planner 602 may generate substantial knowledge about possibly difficult to discover facts or patterns based on requests for proposal 402, thereby generating an effective proposal 406 while using a minimum of time and/or resources 608.

For example, a query may be entered in the form of a perspective or insert perspective. The query may produce a result list of situations associated with the term or terms entered in the query. The result list may be ordered or ranked by the situations that most closely relate to the query. The results may be displayed on a display unit in the form of a worksheet. A user may use the worksheet to see accumulations of information that may indicate where attention should be turned with respect to developing proposal 406.

For example, analyst or planner 602 may be tasked with developing proposal 406 for training troops in a given theater of operations. Analyst or planner 602 may wish to determine which skills are most needed in that theater of operations. To make this determination, instead of manually pouring through requests for proposal 402, as well as perhaps thousands of after-action reports issued by the military in that theater of operations, analyst or planner 602 may use associative memory 606 to search requests for proposal 402 and the after-action reports for the desired information. Thus, analyst or planner 602 may enter search terms such as "skill," "needed," "training," or other relevant search terms into a perspective or insert perspective of associative memory 606. Associative memory 606 is then queried based on these parameters. The query may return a list of associated results displayed in, for example, a worksheet format.

In viewing the worksheet, analyst or planner 602 may see the terms "mortar" and "radio" placed first and highlighted. By actuating links to the source documents for the associated results, analyst or planner 602 may quickly discover that the greatest need for training in the given theater of operations is for use of mortars and for use of a particular kind of radio. Analyst or planner 602 may then use this information in generating proposal 406 for training certain troops in the use of mortars and the particular kind of radio.

Still further, the advantageous embodiments may provide more valuable information that may not have been discovered except through many repeated manual searches or the experience of subject matter experts. For example, through the associations presented in the resulting worksheet, analyst or planner 602 may discover a synergy between use of mortars and the particular kind of radio. For example, training in certain procedures using the radio and using the mortars may lead to more effective results during combat operations. This synergistic effect would not have been discoverable using traditional text or Web searches, and may not have been at all obvious except in hindsight after many hours of subject matter expert review. By using the understanding gained from identifying this synergistic effect, analyst or planner 602 may prepare a more effective proposal 406 than would have otherwise been practical to prepare, and do so in less time than a human alone otherwise might have been able to prepare a similar proposal.

The above example does not limit the advantageous embodiments or the claims. Many other examples are possible.

The advantageous embodiments have additional benefits. For example, the advantageous embodiments may handle unstructured, free text data by breaking the data down into recognizable and comparable units without limiting any data. The advantageous embodiments need not use reductive algorithms or rules like many other data mining techniques. The advantageous embodiments may return a rank-ordered list of similar situations and effective requests for proposal relevant to the items contained in the query generated by the user.

The advantageous embodiments may be versatile. The advantageous embodiments may be a valuable tool for any company or governmental organization using databases containing unstructured, free text data. The advantageous embodiments may be adapted to any information domain for which such unstructured, free text data exists. Thus, the advantageous embodiments are not the specific, exemplary advantageous embodiments described herein.

The advantageous embodiments may be scalable in that the advantageous embodiments may be applied to any size database. The advantageous embodiments may be reusable in that the advantageous embodiments may be applied to a variety of data sources, including text, pictures, symbols, audio, video, or possibly many other kinds of data. The advantageous embodiments may be reusable. The advantageous embodiments may be transferable to any domain.

The advantageous embodiments contemplate using entity analytics within an associative memory technology to produce "entities". Entity analytics may be represented using a perspective. A lookup may be performed within the perspective, which may be an insert perspective. Resulting associations may be returned and displayed. Categories of data and links to sources of data may also be displayed. The link source of found information may be selected for comparison of summarized data within an original context of the source data. Decision making may be based on a provided view of events and/or returned results.

The advantageous embodiments shown in FIG. 3 through FIG. 5 are not meant to imply physical or architectural limitations to the manner in which different advantageous embodiments may be implemented. Other operations in addition to and/or in place of the ones illustrated may be used. Some operations may be unnecessary in some advantageous embodiments. Also, the blocks are presented to illustrate some operations. One or more of these blocks may be combined and/or divided into different blocks when implemented in different advantageous embodiments.

Figure 7:
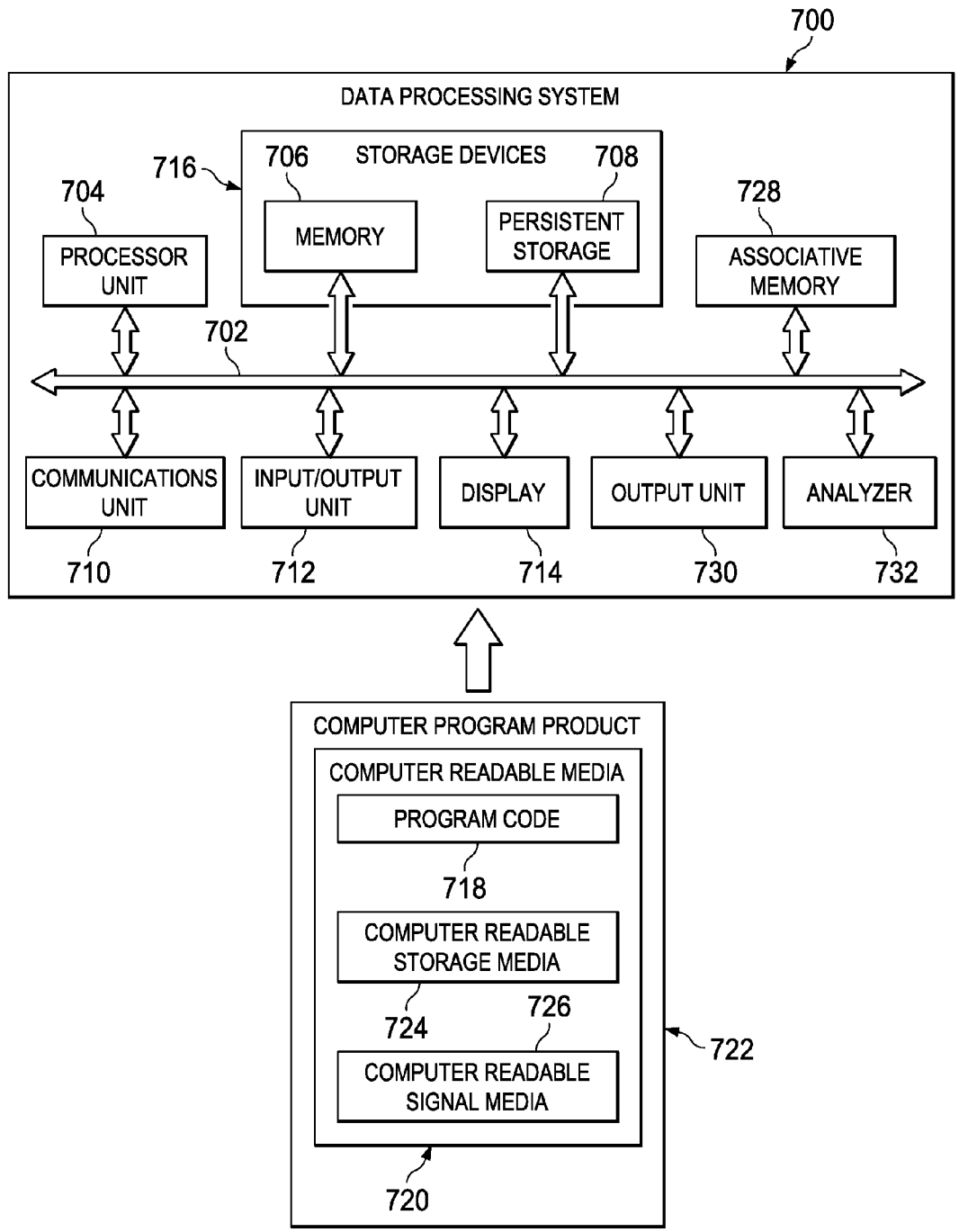
FIG. 7 is an illustration of a data processing system in accordance with an advantageous embodiment.

FIG. 7 is an illustration of a data processing system in accordance with an advantageous embodiment. Data processing system 700 in FIG. 7 is an example of a data processing system that may be used to implement the advantageous embodiments, such as system 100 of FIG. 1, or any other module, system, or process disclosed herein. In this illustrative example, data processing system 700 includes communications fabric 702, which provides communications between processor unit 704, memory 706, persistent storage 708, communications unit 710, input/output (I/O) unit 712, display 714, and associative memory 728. Processor unit 704 may be characterized as a "physical processor" in that processor unit 704 may be a non-transitory processor.

Associative memory 728 may be associative memory 102 of FIG. 1. Associative memory 728 need not be in direct communication with communications fabric 702. For example, associative memory 728 may exchange data with processor unit 704 and/or memory 706 via communications unit 710, such as when associative memory 728 is physically located in a remote location relative to data processing system 700.

Data processing system 700 also may include output unit 730 and/or analyzer 732. Output unit 730 may be output 132 of FIG. 1. Analyzer 732 may be analyzer 124 of FIG. 1. In an advantageous embodiment, analyzer 732 may be processor unit 704. In an advantageous embodiment, output unit 730 may be display 714.

Processor unit 704 serves to execute instructions for software that may be loaded into memory 706. Processor unit 704 may be a number of processors, a multi-processor core, or some other type of processor, depending on the particular implementation. "A number," as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 may be examples of storage devices 716. A storage device may be any piece of hardware that is capable of storing information, such as, data, program code in functional form, and/or other suitable information either on a temporary basis and/or a permanent basis. Storage devices 716 also may be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, may provide for communications with other data processing systems or devices. In these examples, communications unit 710 may be a network interface card. Communications unit 710 may provide communications through the use of either or both physical and wireless communications links.

Input/output unit 712 may allow for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 may provide a mechanism to display information to a user.

Instructions for the operating system, applications, and/or programs may be located in storage devices 716, which may be in communication with processor unit 704 through communications fabric 702. In these illustrative examples, the instructions may be in a functional form on persistent storage 708. These instructions may be loaded into memory 706 for execution by processor unit 704. The processes of the different embodiments may be performed by processor unit 704 using computer implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 may be located in a functional form on computer readable media 720 that is selectively removable and may be loaded onto or transferred to data processing system 700 for execution by processor unit 704. Program code 718 and computer readable media 720 may form computer program product 722 in these examples. In one example, computer readable media 720 may be computer readable storage media 724 or computer readable signal media 726. Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different advantageous embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running a program code. As one example, the data processing system may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing a program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices may include, for example, a programmable logic array, programmable array logic, a field programmable logic array, a field programmable gate array, and other suitable hardware devices. With this type of implementation, program code 718 may be omitted because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

As another example, a storage device in data processing system 700 may be any hardware apparatus that may store data. Memory 706, persistent storage 708, and computer readable media 720 may be examples of storage devices in a tangible form.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 706, or a cache, such as found in an interface and memory controller hub that may be present in communications fabric 702.

The different advantageous embodiments can take the form of an entirely hardware embodiment, an entirely software embodiment, or an embodiment containing both hardware and software elements. Some embodiments may be implemented in software, which includes, but is not limited to, forms such as, for example, firmware, resident software, and microcode.

Furthermore, the different embodiments can take the form of a computer program product accessible from a computer usable or computer readable medium providing a program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, an electronic, magnetic, optical, electromagnetic, infrared, or semiconductor system, or a propagation medium. Non-limiting examples of a computer readable medium may include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, physical or wireless.

A data processing system suitable for storing and/or executing computer readable or computer usable program code may include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times the code may be retrieved from bulk storage during execution of the code.

Input/output or I/O devices can be coupled to the system either directly or through intervening I/O controllers. These devices may include, for example, keyboards, touch screen displays, and pointing devices. Different communications adapters also may be coupled to the system to enable the data processing system to become coupled to other data processing systems, remote printers, or storage devices through intervening private or public networks. Non-limiting examples are modems and network adapters as just a few of the currently available types of communications adapters.

Thus, the advantageous embodiments address the issue of finding relationships in a vast plurality of data in order to make specific decisions regarding particular situations. The advantageous embodiments utilize associative memory technology to perform such tasks.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system for analyzing a first request for proposal from among a plurality of requests for proposal, the system comprising:
an associative memory including a plurality of data, the plurality of data comprising at least one of the group consisting of data for the plurality of requests for proposal, data related to successful proposal bid activities, and data related to unsuccessful proposal bid activities, the plurality of data having a plurality of associations, and being collected into associated units of data, wherein the associative memory is configured to be queried based on at least one relationship selected from the group consisting of direct relationships and indirect relationships among the plurality of data, and wherein the associative memory further includes a content-addressable structure;
an input device in communication with the associative memory, wherein the input device is configured to provide the first request for proposal to the associative memory in a format understandable to the associative memory, and wherein the associative memory is configured to digest the first request for proposal to be included within the plurality of data, wherein a digested request for proposal is formed; and
an analyzer in communication with the associative memory, wherein the analyzer is configured to analyze the digested request for proposal by receiving a query comprising one or more terms, creating relationships among the plurality of data in the associative memory based on the query, and returning an output that includes requirements or other attributes presented in the digested request for proposal based on the query;
wherein the analyzer is further configured to compare the digested request for proposal to a previously received second request for proposal to form a first comparison, and wherein the analyzer is further configured to modify the output based on the first comparison to form a first modified output; and
wherein the analyzer is further configured to compare the digested request for proposal to a previous response to the previously received second request for proposal to form a second comparison, and wherein the analyzer is further configured to modify the output based on the second comparison to form a second modified output.

2. The system of claim 1, wherein the analyzer is further configured to return the output such that a subset of the requirements or other attributes in the digested request for proposal that is of most importance to an issuer of the first request for proposal will be displayed most prominently on a display unit.

3. The system of claim 1 further comprising:
a document management system configured to receive the second modified output and use the second modified output to produce a draft of a response to the first request for proposal.

4. The system of claim 3, wherein the document management system is further configured to receive user input and incorporate the user input with the output to produce the draft.

5. The system of claim 1, wherein the plurality of data includes at least one of unstructured data and free text data.

6. The system of claim 1, wherein the query is received from an insert perspective of the associative memory, wherein the analyzer is further configured to return the output such that a subset of the requirements or other attributes in the digested request for proposal that is of most importance to an issuer of the first request for proposal will be displayed most prominently on a display unit, and wherein the analyzer is configured to return the subset of the requirements or other attributes based on the query.

7. The system of claim 1, wherein the analyzer is further configured to generate a set of links linking the requirements or other attributes to underlying data found in the digested request for proposal, and wherein the system further comprises:
a display unit in communication with the analyzer, the display unit configured to display the output and the set of links.

8. The system of claim 7, wherein the display unit is further configured to display a plurality of categories organized in a first column and a plurality of attributes organized in a second column, and wherein rows across the first column and the second column comprise sets of attributes, in the plurality of attributes, that correspond to particular category entries in the plurality of categories.

9. The system of claim 8, wherein the display unit is further configured to highlight a first attribute in the sets of attributes, wherein the first attribute indicates a particular requirement in the digested request for proposal that is of most importance to an issuer of the first request for proposal.

10. The system of claim 1, wherein the analyzer is further configured to analyze the digested request for proposal by discovering the relationships and storing the relationships.

11. The system of claim 1, wherein the analyzer is further configured to return the output in a time faster than a human working alone could analyze the plurality of data and return the output.

12. The system of claim 1, wherein the analyzer is further configured to return the output based on one or more weights applied to the requirements or other attributes.

13. The system of claim 1, wherein the plurality of data comprises all of the plurality of requests for proposal data, the data related to successful proposal bid activities, and the data related to unsuccessful proposal bid activities.

14. A method for analyzing a request for proposal, the method implemented using a processor in conjunction with an associative memory including a plurality of data having a plurality of associations, wherein the plurality of data is collected into associated units of data, wherein the associative memory is configured to be queried based on at least one relationship selected from the group consisting of direct relationships and indirect relationships among the plurality of data, and wherein the associative memory further includes a content-addressable structure, and wherein the method comprises:
receiving the request for proposal in the associative memory in a format understandable to the associative memory;
digesting, in the associative memory, the request for proposal such that the request for proposal is included within the plurality of data, wherein a digested request for proposal is formed;
analyzing, using the processor in conjunction with the associative memory, the digested request for proposal by receiving a query comprising one or more terms and creating relationships among the plurality of data in the associative memory based on the query;

returning, using the processor in conjunction with the associative memory, an output that includes requirements or other attributes presented in the digested request for proposal based on the query;

comparing the digested request for proposal to a previously received second request for proposal to form a first comparison, and modifying the output based on the first comparison to form a first modified output;

comparing the digested request for proposal to a previous response to the previously received second request for proposal to form a second comparison; and modifying the output based on the second comparison to form a second modified output.

15. The method of claim 14, wherein returning comprises returning the output such that a subset of the requirements or other attributes in the digested request for proposal that is of most importance to an issuer of the request for proposal will be displayed most prominently.

16. The method of claim 14, further comprising:
receiving, using the processor in conjunction with the associative memory, the second modified output; and
producing a draft of a response to the request for proposal using the second modified output received.

17. A data processing system comprising:
a processor;
a bus connected to the processor;
an associative memory connected to the bus, the associative memory including a plurality of data having a plurality of associations, wherein the plurality of data is collected into associated units of data, wherein the associative memory is configured to be queried based on at least one relationship selected from the group consisting of direct relationships and indirect relationships among the plurality of data, and wherein the associative memory further includes a content-addressable structure; and
a non-transitory computer readable storage medium connected to the bus, wherein the non-transitory computer readable storage medium stores a set of instructions which, when executed by the processor, implement a method comprising:
receiving a request for proposal in the associative memory in a format understandable to the associative memory;
digesting, in the associative memory, the request for proposal such that the request for proposal is included within the plurality of data, wherein a digested request for proposal is formed;
analyzing, using the processor in conjunction with the associative memory, the digested request for proposal by receiving a query comprising one or more terms and creating relationships among the plurality of data in the associative memory based on the query;
returning, using the processor in conjunction with the associative memory, an output that includes requirements or other attributes presented in the digested request for proposal based on the query;
comparing the digested request for proposal to a previously received second request for proposal to form a first comparison, and modifying the output based on the first comparison to form a first modified output;
comparing the digested request for proposal to a previous response to the previously received second request for proposal to form a second comparison; and
modifying the output based on the second comparison to form a second modified output.

18. The data processing system of claim 17, wherein the associative memory comprises the non-transitory computer readable storage medium.

19. A non-transitory computer readable storage medium storing instructions which, when executed by a processor, carry out a method for analyzing a request for proposal, the method implemented using the processor in conjunction with an associative memory including a plurality of data having a plurality of associations, wherein the plurality of data is collected into associated units of data, wherein the associative memory is configured to be queried based on at least one relationship selected from the group consisting of direct relationships and indirect relationships among the plurality of data, and wherein the associative memory further includes a content-addressable structure, and wherein the instructions comprise:
instructions for providing the request for proposal to the associative memory in a format understandable to the associative memory;
instructions for digesting, in the associative memory, the request for proposal such that the request for proposal is included within the plurality of data, wherein a digested request for proposal is formed;
instructions for analyzing, using the processor in conjunction with the associative memory, the digested request for proposal by receiving a query comprising one or more terms and creating relationships among the plurality of data in the associative memory based on the query;
instructions for returning, using the processor in conjunction with the associative memory, an output that includes requirements or other attributes presented in the digested request for proposal based on the query;
instructions for comparing the digested request for proposal to a previously received second request for proposal to form a first comparison, and modifying the output based on the first comparison to form a first modified output;
instructions for comparing the digested request for proposal to a previous response to the previously received second request for proposal to form a second comparison; and
instructions for modifying the output based on the second comparison to form a second modified output.

20. The non-transitory computer readable storage medium of claim 19, wherein the instructions for returning comprise instructions for returning the output such that a subset of the requirements or other attributes in the digested request for proposal that is of most importance to an issuer of the request for proposal will be displayed most prominently on a display unit.

21. A system for analyzing a first request for proposal from among a plurality of requests for proposal, the system comprising:
an associative memory including a plurality of data, the plurality of data comprising at least one of the group consisting of data for the plurality of requests for proposal, data related to successful proposal bid activities, and data related to unsuccessful proposal bid activities, the plurality of data having a plurality of associations, and being collected into associated units of data, wherein the associative memory is configured to be queried based on at least one relationship selected from the group consisting of direct relationships and indirect relationships among the plurality of data, and wherein the associative memory further includes a content-addressable structure;

an input device in communication with the associative memory, wherein the input device is configured to provide the first request for proposal to the associative memory in a format understandable to the associative memory, and wherein the associative memory is configured to digest the first request for proposal to be included within the plurality of data, wherein a digested request for proposal is formed; and an analyzer in communication with the associative memory, wherein the analyzer is configured to analyze the digested request for proposal by receiving a query comprising one or more terms, creating relationships among the plurality of data in the associative memory based on the query, and returning an output that includes requirements or other attributes presented in the digested request for proposal based on the query, wherein the analyzer is further configured to return the output such that a subset of the requirements or other attributes in the digested request for proposal that is of most importance to an issuer of the first request for proposal will be displayed most prominently on a display unit, and wherein the analyzer is configured to return the subset of the requirements or other attributes based on the query.

22. A method for analyzing a request for proposal, the method implemented using a processor in conjunction with an associative memory including a plurality of data having a plurality of associations, wherein the plurality of data is collected into associated units of data, wherein the associative memory is configured to be queried based on at least one relationship selected from the group consisting of direct relationships and indirect relationships among the plurality of data, and wherein the associative memory further includes a content-addressable structure, and wherein the method comprises:

receiving the request for proposal in the associative memory in a format understandable to the associative memory;

digesting, in the associative memory, the request for proposal such that the request for proposal is included within the plurality of data, wherein a digested request for proposal is formed;

analyzing, using the processor in conjunction with the associative memory, the digested request for proposal by receiving a query comprising one or more terms and creating relationships among the plurality of data in the associative memory based on the query, wherein the query is received from an insert perspective of the associative memory;

returning, using the processor in conjunction with the associative memory, an output that includes requirements or other attributes presented in the digested request for proposal based on the query;

returning the output such that a subset of the requirements or other attributes in the digested request for proposal that is of most importance to an issuer of the first request for proposal will be displayed most prominently on a display unit; and returning the subset of the requirements or other attributes based on the query.

23. A data processing system comprising:
a processor;
a bus connected to the processor;
an associative memory connected to the bus, the associative memory including a plurality of data having a plurality of associations, wherein the plurality of data is collected into associated units of data, wherein the associative memory is configured to be queried based on at least one relationship selected from the group consisting of direct relationships and indirect relationships among the plurality of data, and wherein the associative memory further includes a content-addressable structure; and a non-transitory computer readable storage medium connected to the bus, wherein the non-transitory computer readable storage medium stores a set of instructions which, when executed by the processor, implement a method comprising:

receiving a request for proposal in the associative memory in a format understandable to the associative memory;

digesting, in the associative memory, the request for proposal such that the request for proposal is included within the plurality of data, wherein a digested request for proposal is formed;

analyzing, using the processor in conjunction with the associative memory, the digested request for proposal by receiving a query comprising one or more terms and creating relationships among the plurality of data in the associative memory based on the query, wherein the query is received from an insert perspective of the associative memory;

returning, using the processor in conjunction with the associative memory, an output that includes requirements or other attributes presented in the digested request for proposal based on the query;

returning the output such that a subset of the requirements or other attributes in the digested request for proposal that is of most importance to an issuer of the first request for proposal will be displayed most prominently on a display unit; and returning the subset of the requirements or other attributes based on the query.

24. A non-transitory computer readable storage medium storing instructions which, when executed by a processor, carry out a method for analyzing a request for proposal, the method implemented using the processor in conjunction with an associative memory including a plurality of data having a plurality of associations, wherein the plurality of data is collected into associated units of data, wherein the associative memory is configured to be queried based on at least one relationship selected from the group consisting of direct relationships and indirect relationships among the plurality of data, and wherein the associative memory further includes a content-addressable structure, and wherein the instructions comprise:

instructions for providing the request for proposal to the associative memory in a format understandable to the associative memory;

instructions for digesting, in the associative memory, the request for proposal such that the request for proposal is included within the plurality of data, wherein a digested request for proposal is formed;

instructions for analyzing, using the processor in conjunction with the associative memory, the digested request for proposal by receiving a query comprising one or more terms and creating relationships among the plurality of data in the associative memory based on the query;

instructions for returning, using the processor in conjunction with the associative memory, an output that includes requirements or other attributes presented in the digested request for proposal based on the query, wherein the query is received from an insert perspective of the associative memory;

instructions for returning the output such that a subset of the requirements or other attributes in the digested request for proposal that is of most importance to an issuer of the first request for proposal will be displayed most prominently on a display unit; and instructions for returning the subset of the requirements or other attributes based on the query.

\* \* \* \* \*

UNITED STATES PATENT AND TRADEMARK OFFICE
CERTIFICATE OF CORRECTION

PATENT NO. : 9,659,110 B2
APPLICATION NO. : 13/277771
DATED : May 23, 2017
INVENTOR(S) : Arnold et al.

It is certified that error appears in the above-identified patent and that said Letters Patent is hereby corrected as shown below:

In the Claims

Column 19, Line 52, change "the output" to -- the second modified output --
    Line 57, change "claim 1 further" to -- claim 1, further --
    Line 64, change "the output" to -- the second modified output --

Column 21, Line 24, change "modified output received." to -- modified output. --

Signed and Sealed this
Twentieth Day of February, 2018

Andrei Iancu
*Director of the United States Patent and Trademark Office*